United States Patent [19]

Frame

[11] Patent Number: 5,044,237

[45] Date of Patent: Sep. 3, 1991

[54] METHOD FOR STAMPING STEPPER MOTOR LAMINATIONS

[75] Inventor: Charles Frame, Clementon, N.J.

[73] Assignee: Magnetic Metals Corporation, Camden, N.J.

[21] Appl. No.: 474,915

[22] Filed: Feb. 5, 1990

[51] Int. Cl.$^5$ ............................................. H02K 15/02
[52] U.S. Cl. ......................................... 83/41; 83/55; 29/598
[58] Field of Search ............... 83/41, 40, 49, 50, 55, 83/45; 29/609, 598, 596

[56] References Cited

U.S. PATENT DOCUMENTS

| | | | |
|---|---|---|---|
| 3,107,566 | 10/1963 | Archer | 83/40 X |
| 3,460,415 | 8/1969 | Philipp | 83/41 X |
| 3,834,013 | 9/1974 | Gerstle | 29/609 |
| 4,280,275 | 7/1981 | Mitsui | 29/732 |
| 4,438,558 | 3/1984 | Mitsui | 29/732 |
| 4,578,853 | 4/1986 | Würth | 29/609 X |
| 4,619,028 | 10/1986 | Neuenschwander | 29/609 |
| 4,809,429 | 3/1989 | Martin | 29/609 X |

Primary Examiner—Douglas D. Watts
Assistant Examiner—Kenneth E. Peterson
Attorney, Agent, or Firm—Seidel, Gonda, Lavorgna & Monaco

[57] ABSTRACT

Metal parts requiring sharply-defined, accurate corners are formed in a two-step process. In the first step, first openings are made in a thin sheet of material, at least one edge of the first opening forming one edge of the desired sharply-defined corner. In the second step, a second opening is formed, wherein one edge of the second opening intersects the edge of the first opening at a predetermined angle. A sharp corner is formed at the intersection of these edges. In a preferred embodiment of the invention, the method is used as an improved method of forming single laminae and stacked laminae for stators and rotors of electric motors; in this embodiment a plurality of first openings are made in an annular array.

4 Claims, 4 Drawing Sheets

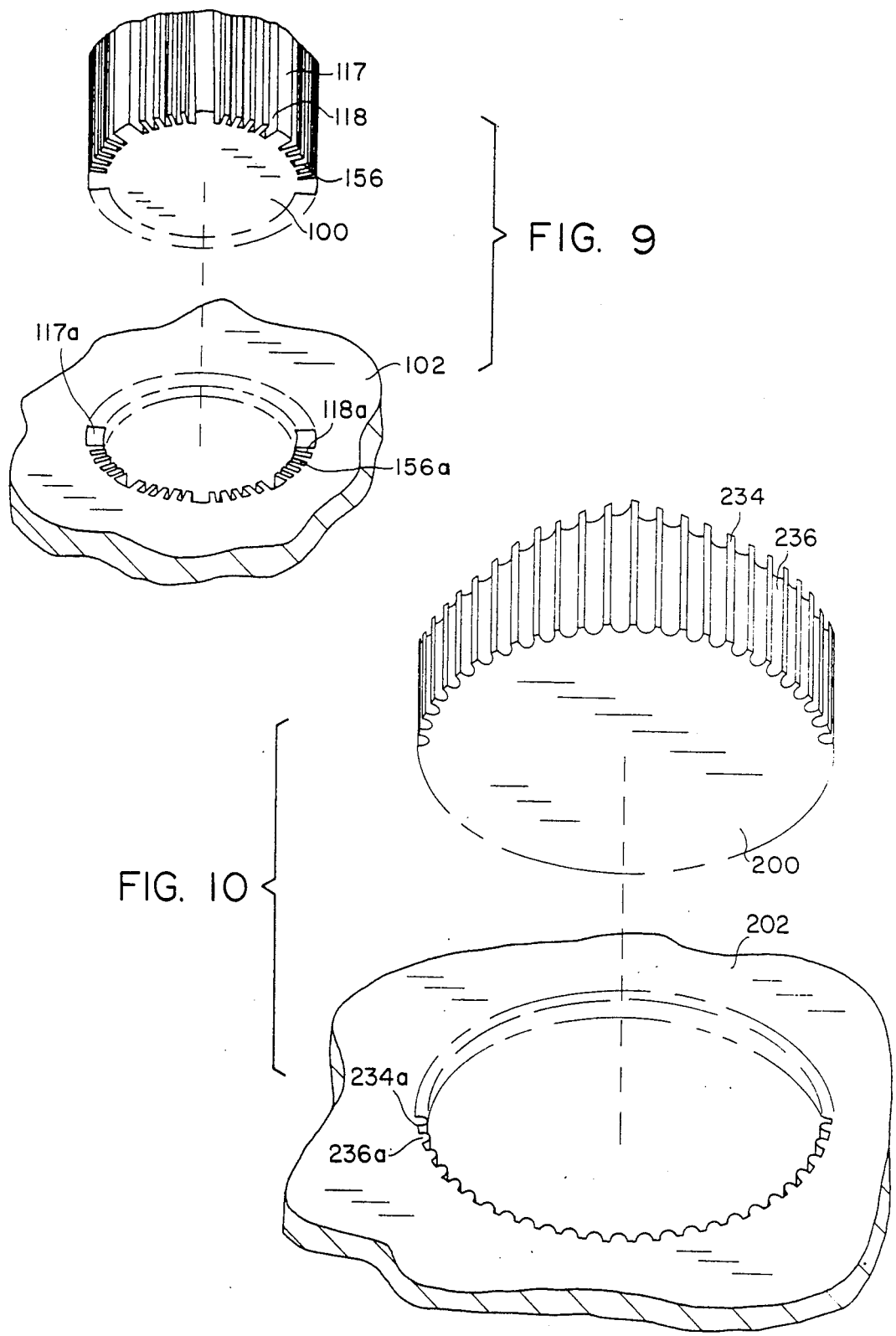

5,044,237

METHOD FOR STAMPING STEPPER MOTOR LAMINATIONS

FIELD OF THE INVENTION

This invention relates to a method of stamping or punching laminae, such as stator and rotor laminae for small electric motors, from a thin sheet of material.

BACKGROUND OF THE INVENTION

Many types of electric motors, such as dynamo-electric machines and stepper motors, utilize laminated metal parts. These parts, such as rotors, stators, and cores, comprise a number of thin metal laminae. The laminae are stamped from a thin sheet of metal and stacked in alignment to form the desired part.

In stamping out the laminae for rotors and stators, it is important that corners and edges of the teeth be sharp, clearly-formed, and of consistent dimension. If the corners of each tooth are not clearly defined, or the outlines of the teeth are inconsistent from lamina to lamina as many laminae are stamped out, the laminae will not stack properly and the motor will be noisy and inefficient. Therefore, it is important that the teeth in each lamina be stamped within very fine tolerances and have sharp, clearly-defined corners and edges.

It has long been a problem in the art to stamp out teeth of small size and accurate shape without damaging the part, for instance by bending the teeth in the course of stamping.

In the case of, for example, the stepper motor stator shown in FIG. 1, there are two parameters which must be carefully controlled in order to produce a satisfactory lamina. The first is the inner diameter formed by the outermost edges of the inward-facing teeth 18. Because a rotating part will be moving within the space defined by the inner diameter, it is important that the inner diameter be correct and uniform from lamina to lamina. The other important parameter is the shape of each of the teeth 18. If the teeth do not form sharp, consistent shapes when the laminae are stacked, the motor will be noisy and inefficient.

In the stamping art, there are generally two standard practices to overcome the problems of stamping out small teeth without damaging the metal. One of these practices is to stamp the teeth in one die station and the inner diameter in another die station within the same die. In effect, the second die clips each tooth down to the appropriate inner diameter. This procedure has an inherent shortcoming, in that use of more than one die station requires particularly careful alignment and coordination of the cut of each die. Sometimes, in order to stamp small teeth without bending them, half the teeth are stamped in one station, and the other half are stamped in the following station, followed by the cutting of the inside diameter. Such a procedure not only increases expense, but introduces another possible source of inaccuracy.

Another type of manufacturing process commonly used is to stamp the edge of the lamina and all the teeth at the same time, using a spline punch and die ring. This method avoids the problems of aligning two die stations but has its own drawback: it is impossible to create a sharp corner on a tooth tip since, as a practical matter, a perfectly sharp corner on an inside corner of a spline cannot be formed. Best efforts have achieved a .003 inch radius but this still varies from between 0.005 to 0.007 inch on the finished part due to wear and material break when sheared.

Various methods for cutting or stamping teeth in a lamina under the exacting conditions required for electric motors are described in other patents. Gerstle U.S. Pat. No. 3,834,013 shows a sequence of steps for cutting out a lamina for a stator. First a circular opening that will correspond to the inner diameter of the stator is cut. Then, a plurality of openings are cut around the rim of the circular opening. These openings will become the interstices between the teeth of the stator. Finally, openings are cut connecting each of the smaller openings to the central circular opening, so that the interstices are fully defined. According to the specification of the Gerstle patent, at column 4, lines 15-17, the tips of the teeth must be trimmed in a shaving operation to conform to the intended inner diameter of the stator.

Mitsui U.S. Pat. No. 4,280,275 (of which U.S. Pat. No. 4,438,558 is a continuation) shows another sequence for cutting teeth in a stator lamina. First, a plurality of openings forming a circular array, representing the interstices of the teeth, are cut in a thin metal sheet. Then, a central section representing the inner diameter is blanked out.

In the methods of both of these patents, teeth with well-defined edges are produced, but because the interstices and the inner diameter are produced in separate steps, and the large inner portion defining the inner diameter is removed from the metal after the interstices are cut, the stamping force to remove the inner portion places stress on the teeth, causing them to bend or be otherwise damaged. Consequently, there is a limit on how small the teeth of the stator can be made. If the individual teeth are too small, they may well be damaged by the stamping force in blanking out the central portion, or in cutting the slots to the central portion.

SUMMARY OF THE INVENTION

The present invention is a method for forming a sharp corner on a part as it is stamped from a thin metal sheet.

A first opening is pre-punched into the metal. The first opening has at least one substantially straight edge. The edge will become one of the edges which form the sharp corner. Then, a second opening is punched in the metal, substantially in the shape of the desired part, except that the edge forming the second edge of the sharp corner is arranged to intersect the first edge of the sharp corner which was formed by the first opening. In this way, a sharp corner is formed by the intersection of the edges formed by the first and second stamping of the metal.

In another embodiment of the invention, a method is described of stamping from a thin sheet a part having on its edge a plurality of substantially rectangular teeth, such as a stator or rotor. First, a plurality of small openings are stamped. Each of the small openings has one straight edge which corresponds to the outermost edge of an individual tooth in the intended part. Then, a cut is stamped into the metal of such a shape as to define the side edges of each tooth and the interstices between each tooth. The cuts representing the side edges of each tooth intersect at a predetermined angle the outermost edge of each tooth, which was cut by the stamping of the first plurality of openings. The intersections between these cuts form the sharp corners of the desired part.

It should be noted how the method of the present invention differs from, for example, the method of the Gerstle patent. In Gerstle, a plurality of small openings is cut in the thin sheet, but each small opening represents the two side edges and the interstice between two teeth. In the present invention, each of the first openings corresponds to the outermost edge of a substantially rectangular tooth. The cutting of the interstices and side edges of each tooth is done in the second step. Similarly, the Mitsui patents show the cutting of the interstices in the first step and the removal of the central section, defining the inner diameter, in a second step. In the present invention, because the edges defining the side edges and interstices of the teeth are cut last, the teeth themselves remain undefined until the final cutting step. With the method of the present invention, there is no stress on the teeth when the center portion of the part is removed to form the inner diameter.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 9 is an exploded view of a spline punch that can be used in the manufacture of the lamina of FIG. 1.

FIG. 10 is an exploded view of a spline punch that can be used in the manufacture of the lamina of FIG. 5.

DETAILED DESCRIPTION OF THE INVENTION

Figure 1:
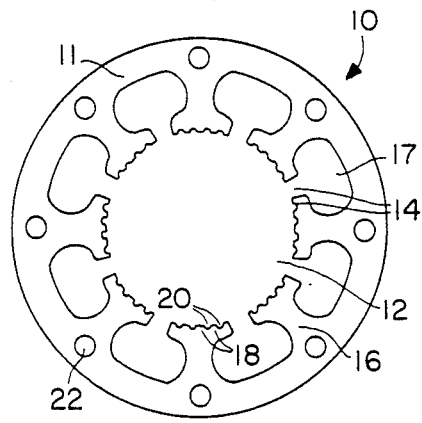
FIG. 1 is a plan view of a stator of a stepper motor, made by the method of the present invention.

Referring to the drawings, in which like reference numerals indicate like elements, FIG. 1 illustrates in plan view a lamina 10, which is used to form the stator of a stepper motor. A plurality of laminae 10 are typically stacked together to form a laminated part with a transverse cross-section as shown in FIG. 1. Lamina 10 is circular and has a central opening 12 forming an inner diameter shown by the dotted lines 14. Extending towards the inner diameter 14 from the outer rim 11 of lamina 10 are a plurality of projections 16, with voids 17 therebetween. Each projection 16 terminates in a plurality of small teeth 18, with a plurality of interstices 20 therebetween. Each lamina 10 may further comprise a plurality of bolt openings 22, through which bolts or rods are inserted to align a stack of laminae 10. Alternatively, each stamped lamina may include a plurality of circular or rectangular extrusions whereby the laminae 10 are pressed together in the die to a finished stack size. A combination of bolts and extrusions may also be used.

Stepper motor laminations are usually made of silicon grade material M19 or M36, and sometimes cold rolled steel in gauges of 0.014", 0.0185" and 0.025" thick. It is also common to provide laminations in metric units, usually 0.5 mm.

Figure 2A:
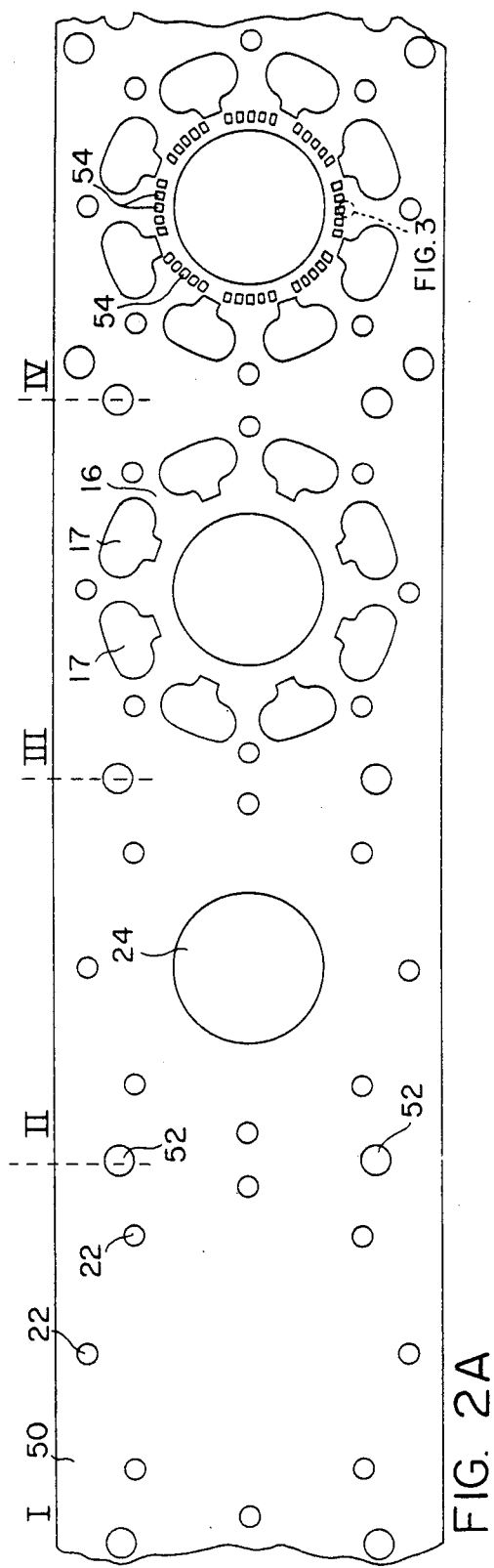
FIG. 2, which is divided into FIGS. 2A and 2B on successive pages, shows the sequence of steps to form the stator of FIG. 1.
Figure 2B:
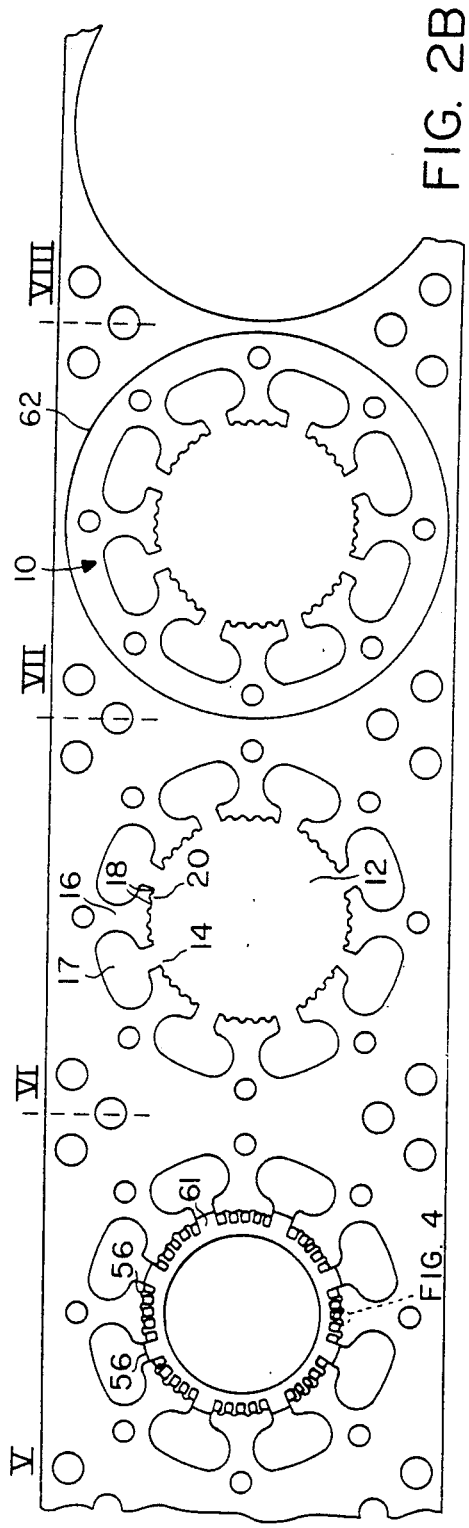

FIG. 2, which is divided into FIGS. 2A and 2B on successive pages in the drawings, shows a sequence of eight steps, enumerated with Roman numerals, by which the lamina 10 shown in FIG. 1 is formed from a strip of sheet material 50. At the beginning of the process the sheet material is provided with conventional index openings 52, by which the sheet of material is indexed from one die to the next.

At step I in FIG. 2A, a plurality of bolt openings 22 are struck in the thin sheet. At step II a first central opening 24 is struck out. This first central opening is in the general shape and location of central opening 12 in the final product, although the final shaping of the central opening 12 will be performed at a later step.

At step III a plurality of voids 17 are struck in the sheet 50. Voids 17 form the interstices between the projections 16, which will project inwardly from the outer rim of the finished product.

Figure 3:
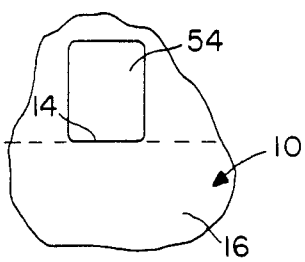
FIG. 3 is a detailed view of an opening cut into the material in one step of the sequence shown in FIG. 2.

At step IV, a plurality of first openings 54 are struck in an annular array around first central opening 24. The edge of each opening 54 furthest from the center of the lamina 10 will become the outermost edge of each substantially rectangular tooth 18 of the finished product. In the preferred embodiments, every other opening 54 in the circular array is stamped out in a first die station, and the remainder in a second die station. FIG. 3 is a detailed view, showing the relationship of one opening 54 to the inner diameter 14 of the finished product. The outermost edge of opening 54 overlies diameter 14, corresponding to the outermost edge of each tooth and, thus, the inner diameter of the finished lamina 10.

Figure 4:
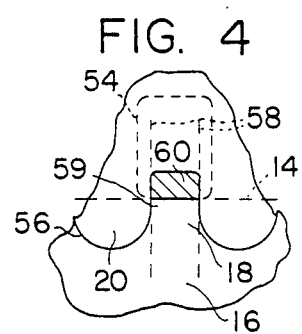
FIG. 4 is a detailed view of the shape of another cut made in the sheet material at another step in the sequence shown in FIG. 2.

Referring to FIG. 2B, steps V and VI show the next blanking step in which the side edges of each tooth 18 and the interstices 20 between each tooth are formed. (Steps V and VI actually occur at the same time within the sample die station; the shape is cut out and the excess material is struck in a single step. For purposes of illustration, however, this single step is here divided into steps V and VI.) A detailed view of an individual tooth 18 is shown in FIG. 4. Solid line 56 shows the edge of the material cut by a spline punch 100, described below. The material above solid line 56 in FIG. 4 is removed in steps V–VI. The punching steps form the sides of each tooth 18, and the interstices 20 between each tooth 18.

FIG. 9 is a simplified view of the spline punch 100 with its corresponding female die 102, which performs the stamping operation. Metallic strip 50 is disposed between spline punch 100 and die 102 so that a portion having the shape of the spline punch 100 will be punched out of the metal. Spline punch 100, in its toothed portions, comprises splines 156 with grooves 118 between them. Splines 156 in spline punch 100 fit into grooves 156a in die 102, as grooves 118 in spline punch 100 receive splines 118a in the female die 102. Also, for the areas between projections 16 on lamina 10, spline punch 100 also includes blank areas 117 which fit into slots 117a in die 102.

FIG. 4 shows how sharp corners 59 are formed on the teeth 18 by a combination of the cuts formed by opening 54 and line 56. As was mentioned above, the edge of opening 54 furthest from the center of the lamina 10 coincides with the inner diameter of 14 of the central opening. As such, this edge of each opening 54 forms the outer edge of each individual tooth 18. The material above line 56 in FIG. 4, removed by the spline punch in step VI, forms the curved interstices 20 between each tooth 18, as well as the straight sides of each tooth 18. Dotted lines 58 represent extrapolations of the angle at which the sides of each tooth 18 intersect with the outer edge of each tooth 18 as represented by dotted line 14. Dotted lines 58 may be truly parallel, but may also represent radii from the center of the lamina 10. At corner 59 dotted lines 58 form substantially right angles with the inner diameter 14, although the dies may be designed so that the side edges of each tooth 18 intersect the outer edge at any preselected angle. Because the inner diameter 14, which also represents the outer edge of each tooth 18, and the side edges 58 of each tooth 18 are cut in separate steps, the corners 59 that are formed at the intersection of lines 14 and 58 are sharper and more distinct than is possible with methods of the prior art.

Shaded area 60 in FIG. 4 represents an area which is encompassed by the spline's 118 of spline punch 100 in steps VI-VII. Because the area 60 is within the opening 54 formed in a previous step, however, no metal is actually removed from around area 60 in steps VI-VII. Area 60 corresponds to the innermost portion of grooves in spline punch 100, but for purposes of the invention the important feature is the edge formed by spline punch 100 where lines 58 intersect line 14. The innermost portion of grooves 118, which are intended to blank around area 60, may be of any shape, such as rectangular or semicircular.

Steps VII and VIII in the drawings also take place simultaneously, but are here shown as separate steps for purposes of illustration. In this final step the entire lamina is blanked around line 62 and removed from the strip of sheet material 50, producing the finished lamina 10.

Certain advantages of the method of the present invention over the prior art should be noted. In, for example, the method of the Gerstle patent, a plurality of openings in a annular array, forming the interstices between each tooth, are cut in an early step of the process. Then, individual slots are cut between each of the smaller openings and the circular central opening, and the tips of each tooth must be trimmed in a shaving operation to form the appropriate size of the central opening. In the Mitsui patents, openings representing the interstices between each tooth are cut in a circular array in the metal. Then, the central portion, forming the inner diameter, is blanked out, leaving the individual teeth free-standing. This process of forming the two side edges of each tooth and then punching out the central portion may subject the teeth to a bending stress as the central portion is blanked out. Consequently the teeth formed by the Mitsui process must be of a minimum size and strength to withstand the punching out of the central portion.

The method of the present invention does not require a trimming of the teeth edges to conform to a necessary inner diameter, as required by the Gerstle patent. Further, because the method of the present invention forms the interstices between the teeth (which determines the size and therefore strength of the teeth) only at the last cutting step, the teeth can be designed to be very small without raising the problem of having the small teeth damaged by the stress of a final blanking of a central portion, as in the Mitsui method. Instead of making one cut for the shape of the teeth and another cut for the inner diameter, the cutting of the openings 54 effectively encompasses both crucial operations. Edge 14 of each opening 54 represents both a usably distinct edge for a tooth, and also represents the inner circumference formed by the outermost edges of the teeth 18. (In the stamping of laminae for small electric motors, it is usually preferable to shape the outer edge of each tooth to follow the inner or outer circumference of the part, as opposed to being perfectly straight.) So, although two stamping operations are used, the cutting of openings 54 accomplishes all of the stamping requiring high accuracy in one single step.

Figure 5:
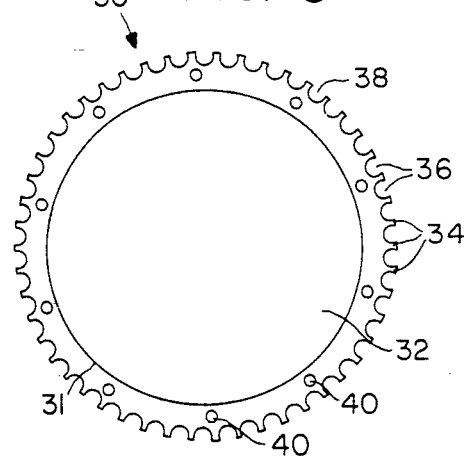
FIG. 5 is a plan view of a rotor for a stepper motor, made according to the method of the present invention.

FIG. 5 is a plan view of a lamina 30 to form a rotor as would be found in a typical stepper motor. The lamina 30 has a central circular opening 32, and on its outer edge a plurality of substantially rectangular-shaped teeth 34 with curved interstices 36 therebetween. The outer edges of the teeth 34 together form an outer diameter 38, shown in dotted lines. Lamina 30 also comprises a plurality of bolt openings 40, which, as in the stator 10 in FIG. 1, accommodate a plurality of rods or bolts by which a number of lamina 30 are stacked to form a thick rotor. Alternatively each rotor lamina may be provided with circular or rectangular extensions whereby a plurality of laminae are pressed together to a finished stack size.

Figure 6A:
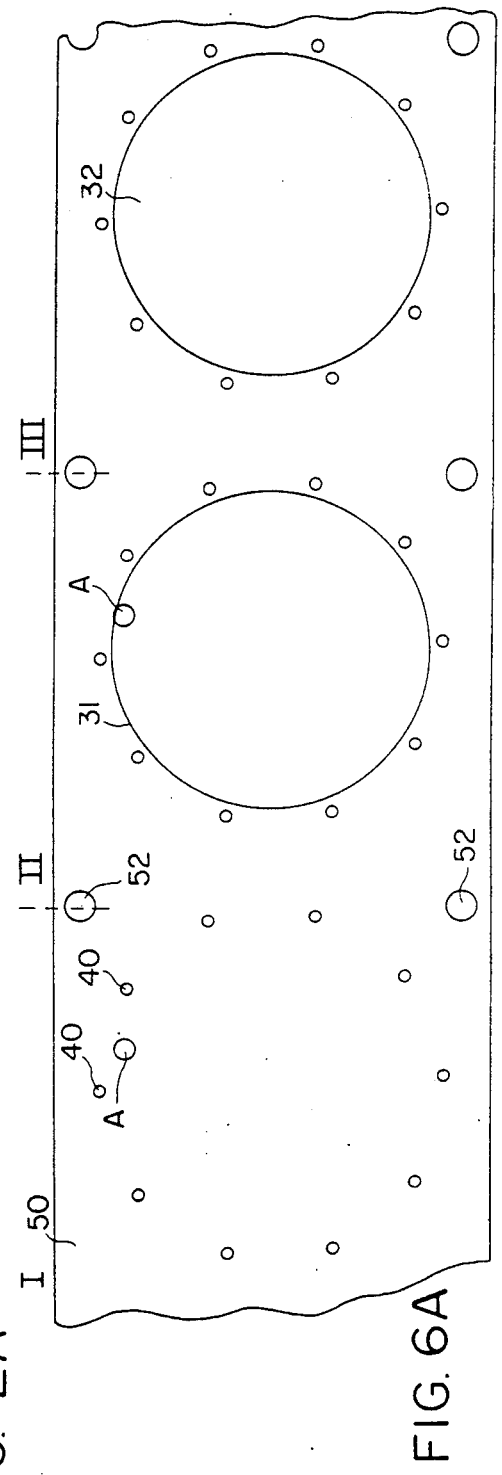
FIG. 6, which is divided into FIGS. 6A and 6B on successive pages, shows a sequence of steps to form the rotor of FIG. 5.
Figure 6B:
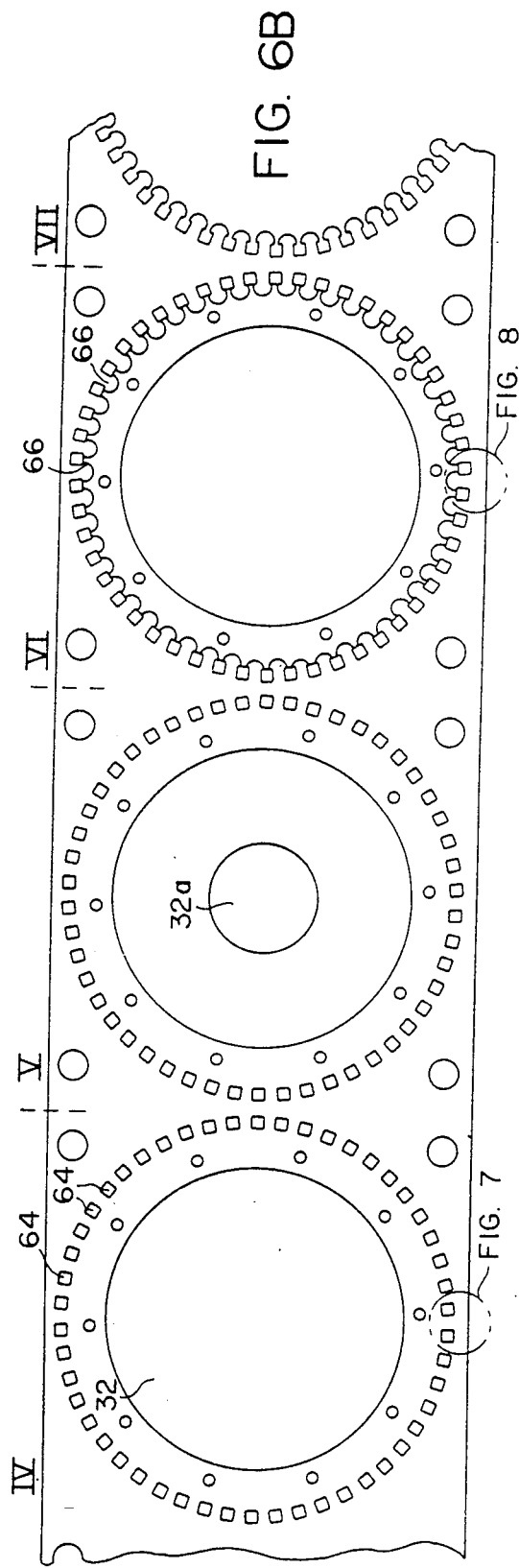

FIGS. 6A and 6B, on two successive pages, show the sequence of steps by which the lamina 30 is stamped from a strip of a sheet material 50. As in the embodiment of FIGS. 2A and 2B, the strip of sheet material 50 is provided with conventional progression holes 52 whereby the strip 50 may be indexed from one cutting die to the next. In step I of FIG. 6A, the plurality of bolt openings 40 are stamped into the material 50. The opening which will later form an alignment notch, A, is shown to demonstrate that a large portion of the area encompassed by bolt holes 40 will be removed in a subsequent step.

In step II, an inner rim 31 is cut into the strip 50. In step III, the portion of material within the inner rim 31 is removed to form central opening 32, as shown by the disappearance of most of the opening A between steps II and III. The small portion left of opening A may be used as an alignment notch. Also shown is a smaller central opening 32a which may be made instead of the large central opening 32, depending on the specific need for the finished rotor.

Figure 7:
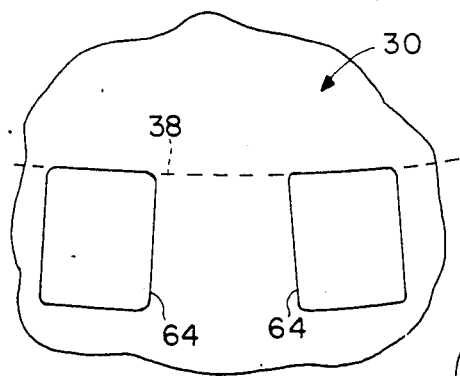
FIG. 7 is a detailed view of the openings formed at one step in the sequence of steps shown in FIG. 6B.

In step IV, a plurality of first openings 64 are cut around the perimeter of the intended part. Each first opening 64 corresponds to an individual tooth on the finished lamina 30. For each first opening 64, the edge closest to the central opening 32 forms the outermost edge of each tooth 34, as well as the outer diameter 38 shown in the finished part of FIG. 5. FIG. 7 is a detailed view of two first openings 64. The dotted line 38 in FIG. 7 represents what will be the outer circumference of lamina 30; that is, the outermost edge of each tooth 34.

Figure 8:
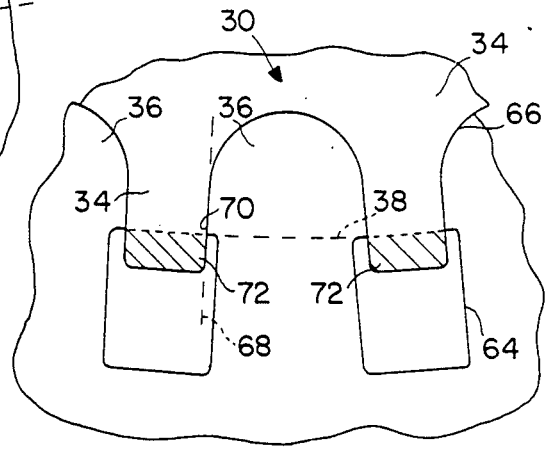
FIG. 8 is a detailed view of another cut made into the sheet material at another step in the sequence of steps shown in FIG. 6B.

In steps VI and VII (which occur simultaneously, but are here shown as two separate operations), the second cut 66 is made in strip 50. This cut 66 defines both the side edges of each tooth 34 and the substantially curved interstices 36 between each tooth 34. FIG. 8 is a detailed view of the formation of two of the teeth 34. In FIG. 8 cut 66 represents the shaping of the side edges and interstices of each tooth; in the striking operation, the material above line 66 is stamped out and becomes part of the lamina 30.

FIG. 10 is an exploded view of the spline punch 200 and its associated female die 202, which are used to perform the final blanking step VI and VII in FIG. 6b. Around the perimeter of spline punch 200 is a series of splines 234 with curved grooves 236 therebetween. The splines and grooves fit into corresponding complementary grooves 234a and splines 236a in female die 202. The strip of sheet material 50 is disposed between spline punch 200 and die 202, and when the spline punch 200 is pressed downward, the cut which is formed by line 66 in step VI is made and the rotor lamina 30 simultaneously blanked out, as in step VII. The splines 234 around spline punch 200 are dimensioned so that their outermost edges will extend into the first openings 64 which were formed in a previous step.

Teeth 34, with sharp, well-defined corners 70, and curved interstices 36, are formed by the intersection of openings 64 and cut 66. In FIG. 8 dotted line 38 represents the outer edge of each tooth 34 formed by the inner edge of each first opening 64; dotted line 68 is an extrapolation of the angle of the side edge of each tooth 34 where it intersects with line 38 to form a sharp corner 70. The area encompassed by the area above line 66 includes the shaded area 72; but since the area within shaded area 72 was removed by the stamping of first openings 64 in a previous step, shaded area 72 is not struck in this operation.

Just as in the case of forming the inwardly-directed teeth of the stator lamina 10 in FIG. 1, the manufacture of rotor lamina 30 in FIG. 5 has the same advantages over methods of the prior art.. Again, there is no need to trim the teeth 34 to obtain a desired outer diameter; and, since the size of the teeth and interstices are determined in the final cutting step, no stress is placed on small teeth by subsequent cutting steps. It has been found that this design construction, being simpler than methods of the prior art, has resulted in savings of 50% in manufacturing costs over prior methods.

The present invention may be embodied in other specific forms without departing from the spirit or essential attributes thereof and, accordingly, reference should be made to the appended claims, rather than to the foregoing specifications, as indicating the scope of the invention.

I claim:

1. A method of stamping stator laminae for rotary electric machines from a thin sheet of material, the laminae having a plurality of substantially rectangular teeth with interstices therebetween, said teeth being on an inner edge of the stator, comprising the steps of:
   pre-punching in the thin sheet a plurality of openings, each of said openings having an edge which lies on the circumference of a circle centered about the center of the lamina, said edges defining the inner diameter of the stator; and
   punching from the thin sheet a portion of material therefrom using a spline punch whereby the punched portion defines side edges of each of the teeth on the stator and the interstices between the teeth, the side edges of each of the teeth being parallel to each other whereby intersections are, intersections formed by the punched portion defining the side edges of the teeth and the edges of each of the openings defining the inner diameter, the intersections forming sharp corners.

2. The method as in claim 1, wherein the plurality of openings and the plurality of teeth so formed form an annular array.

3. A method of stamping rotor laminae for rotary electric machines from a thin sheet of material, the laminae having a plurality of substantially rectangular teeth with interstices therebetween, said teeth being on an outer edge of the rotor, comprising the steps of:
   pre-punching in the thin sheet a plurality of openings, each of said openings having an edge which lies on the circumference of a circle centered about the center of the lamina, said edges defining the outer diameter of the rotor; and
   punching from the thin sheet a portion of material therefrom using a spline punch whereby the punched portion defines side edges of each of the teeth on the rotor and the interstices between the teeth, the side edges of each of the teeth being parallel to each other, whereby intersections are formed by the punched portion defining the side edges of the teeth and the edges of each of the openings defining the outer diameter, the intersections forming sharp corners.

4. The method as in claim 3, wherein the plurality of openings and the plurality of teeth so formed form an annular array.

* * * * *